United States Patent
Sabol et al.

(10) Patent No.: US 8,654,919 B2
(45) Date of Patent: Feb. 18, 2014

(54) WALK-THROUGH IMAGING SYSTEM HAVING VERTICAL LINEAR X-RAY SOURCE

(75) Inventors: John Michael Sabol, Sussex, WI (US); Lawrence E. Murphy, Shorewood, WI (US); Kadri Nizar Jabri, Oak Creek, WI (US); Anila Lingamneni, Hartland, WI (US); Scott William Robinson, Bayside, WI (US); David L. Widmann, Fox Point, WI (US)

(73) Assignee: General Electric Company, Schenectady, NY (US)

( * ) Notice: Subject to any disclaimer, the term of this patent is extended or adjusted under 35 U.S.C. 154(b) by 116 days.

(21) Appl. No.: 13/171,676

(22) Filed: Jun. 29, 2011

(65) Prior Publication Data

US 2012/0128124 A1    May 24, 2012

Related U.S. Application Data

(60) Provisional application No. 61/416,637, filed on Nov. 23, 2010.

(51) Int. Cl.
    *A61B 6/02*    (2006.01)
(52) U.S. Cl.
    USPC .............................................. 378/22; 378/57
(58) Field of Classification Search
    USPC ........................................ 378/21, 22, 26, 57
    See application file for complete search history.

(56) References Cited

U.S. PATENT DOCUMENTS

| | | | |
|---|---|---|---|
| 3,780,291 A | 12/1973 | Stein et al. | |
| 6,094,472 A | 7/2000 | Smith | |
| 7,152,785 B2 | 12/2006 | Metz et al. | |
| 7,558,438 B1* | 7/2009 | Sasada | 382/132 |
| 7,664,222 B2 | 2/2010 | Jabri et al. | |
| 2003/0007594 A1* | 1/2003 | Ganin | 378/22 |
| 2004/0101104 A1* | 5/2004 | Avinash et al. | 378/98.12 |
| 2005/0002550 A1 | 1/2005 | Jabri et al. | |

(Continued)

FOREIGN PATENT DOCUMENTS

| | | |
|---|---|---|
| EP | 1486902 A1 | 12/2004 |
| WO | 9406351 A1 | 3/1994 |
| WO | 2006071002 A1 | 7/2006 |
| WO | 2008064398 A1 | 6/2008 |

OTHER PUBLICATIONS

Search Report and Written Opinion from EP Application No. 11189443.2 dated Mar. 30, 2012.

(Continued)

*Primary Examiner* — Glen Kao
(74) *Attorney, Agent, or Firm* — Ziolkowski Patent Solutions Group, SC (57) ABSTRACT

A system and method for acquiring x-ray imaging data from a subject is disclosed. The x-ray imaging system includes a first support structure oriented in a vertical fashion and a second support structure oriented in a vertical fashion and spaced apart from the first support structure to define a scanning area configured to receive a subject to be scanned. A linear x-ray source is affixed to the first support structure on one side of the scanning area and is oriented in a vertical fashion, with the linear x-ray source configured to emit x-rays towards the subject. A linear detector arrangement is affixed to the second support structure on another side of the scanning area and is generally opposite the linear x-ray source. The linear detector arrangement is configured to receive x-rays after passing through the subject.

14 Claims, 3 Drawing Sheets

(56) References Cited

U.S. PATENT DOCUMENTS

| | | | |
|---|---|---|---|
| 2006/0104411 A1* | 5/2006 | Hoffman | 378/19 |
| 2007/0009088 A1 | 1/2007 | Edic et al. | |
| 2007/0258562 A1 | 11/2007 | Dinca et al. | |
| 2009/0116617 A1* | 5/2009 | Mastronardi et al. | 378/57 |

* cited by examiner

WALK-THROUGH IMAGING SYSTEM HAVING VERTICAL LINEAR X-RAY SOURCE

CROSS-REFERENCE TO RELATED APPLICATION

The present application is a non-provisional of, and claims priority to, U.S. Provisional Application No. 61/416,637, filed Nov. 23, 2010, the disclosure of which is incorporated herein by reference.

BACKGROUND OF THE INVENTION

Embodiments of the invention relate generally to diagnostic imaging and, more particularly, to a walk-through type imaging system having a linear x-ray source and detector arrangement configured to acquire x-ray imaging data from a subject.

Walk-through imaging systems for acquiring information about a subject have become an increasingly valuable tool in recent years, as such systems enable high-throughput, efficient imaging of a large number of subjects in a very cost effective manner. One example of the implementation of such walk-through imaging systems is their use as airport and anti-theft scanners. It is known, however, that such walk-through imaging systems are limited in the data that they acquire, in that they are designed only for the specific purpose of security or theft prevention. Thus, the purpose of these walk-through imaging systems is not to diagnose or provide health information to the individual, and such systems, in fact, lack that capability to provide health information to/about the individual.

Typically, in order to diagnose or provide health information to an individual, a more conventional medical imaging system is required. For example, a computed tomography (CT) imaging system is often implemented for diagnosing or providing health information to/about an individual. In many CT imaging systems, a subject lays supine within a bore of the imaging system, with an x-ray source and detector array being rotated about a CT gantry within an imaging plane and around the subject. The x-ray source emits a fan-shaped beam toward the subject that is attenuated and impinges upon an array of radiation detectors to generate image data, with three-dimensional data being reconstructed in the form of a number of slices through the subject.

While CT imaging systems and other conventional medical imaging systems provide detailed images of a subject that allow for the diagnosing and providing of health information to/about an individual, it is recognized that such systems are not capable of accommodating a large number of subjects in a timely manner. That is, the throughput of CT imaging systems and other conventional diagnostic imaging systems is limited based on the time required to position the patient for imaging. Conversely, and as set forth above, while walk-through imaging systems do provide a high-throughput of subjects, they currently lack the capability to diagnose or provide health information on an individual.

Therefore, it would be desirable to design a walk-through type imaging system capable of capturing image data that provides for diagnosing or providing health information to/about an individual. It would also be desirable for such a walk-through type imaging system to capture image data in such a way as to enable a patient to move through the system in an efficient and convenient manner, so as to provide high-throughput, efficient imaging of a large number of patients in a very cost effective manner.

BRIEF DESCRIPTION OF THE INVENTION

Embodiments of the invention are directed to a system and method for acquiring x-ray imaging data from a subject. A walk-through imaging system includes a first and second vertically oriented support structures that define a scanning area configured to receive a subject to be scanned. A linear x-ray source is affixed to the first support structure on one side of the scanning area and is oriented in a vertical fashion, and a linear detector arrangement is affixed to the second support structure on another side of the scanning area and is generally opposite the linear x-ray source to receive x-rays after passing through the subject.

According to an aspect of the invention, an x-ray imaging system includes a first support structure oriented in a vertical fashion and a second support structure oriented in a vertical fashion and spaced apart from the first support structure to define a scanning area configured to receive a subject to be scanned. The x-ray imaging system also includes a linear x-ray source affixed to the first support structure on one side of the scanning area and oriented in a vertical fashion, with the linear x-ray source configured to emit x-rays towards the subject. The x-ray imaging system further includes a linear detector arrangement affixed to the second support structure on another side of the scanning area and generally opposite the linear x-ray source. The linear detector arrangement configured to receive x-rays after passing through the subject.

According to another aspect of the invention, a walk-through imaging system includes a gate structure including a first vertical member and a second vertical member spaced apart from the first vertical to define a scanning area, a linear x-ray source configured to emit x-rays towards the subject and being affixed to the first vertical member and positioned vertically thereon, and a linear detector arrangement affixed to the second vertical member and positioned vertically thereon, with the linear detector arrangement configured to receive x-rays attenuated through the subject. The walk-through imaging system also includes a data acquisition system (DAS) connected to the detector arrangement and configured to receive an output of the detector arrangement, which is utilized to generate an image of at least a portion of the subject. The linear x-ray source and linear detector arrangement are configured to acquire x-ray image data from a subject situated within the scanning area in a standing position.

According to yet another aspect of the invention, a method of acquiring x-ray images of a subject by way of a walk-through imaging system includes the steps of positioning a subject within a scanning area of a gate structure that includes a first vertical member and a second vertical member spaced apart from the first vertical and generating primary x-rays from a vertically oriented linear x-ray source affixed to the first vertical member on one side of the scanning area to scan the subject. The method also includes the steps of receiving x-rays attenuated through the subject from the primary x-rays with a detector arrangement affixed to the second vertical member and on another side of the scanning area generally opposite the linear x-ray source and generating x-ray image data based on the x-rays received by the detector arrangement, the x-ray image data comprising a number of projection views at differing angles. The method further includes the step of performing at least one of storage of the x-ray image data and reconstruction of the x-ray image data to generate a tomographic image of the subject.

These and other advantages and features will be more readily understood from the following detailed description of preferred embodiments of the invention that is provided in connection with the accompanying drawings.

BRIEF DESCRIPTION OF THE DRAWINGS

The drawings illustrate preferred embodiments presently contemplated for carrying out the invention.

In the drawings.

DETAILED DESCRIPTION OF PREFERRED EMBODIMENTS

Figure 1:
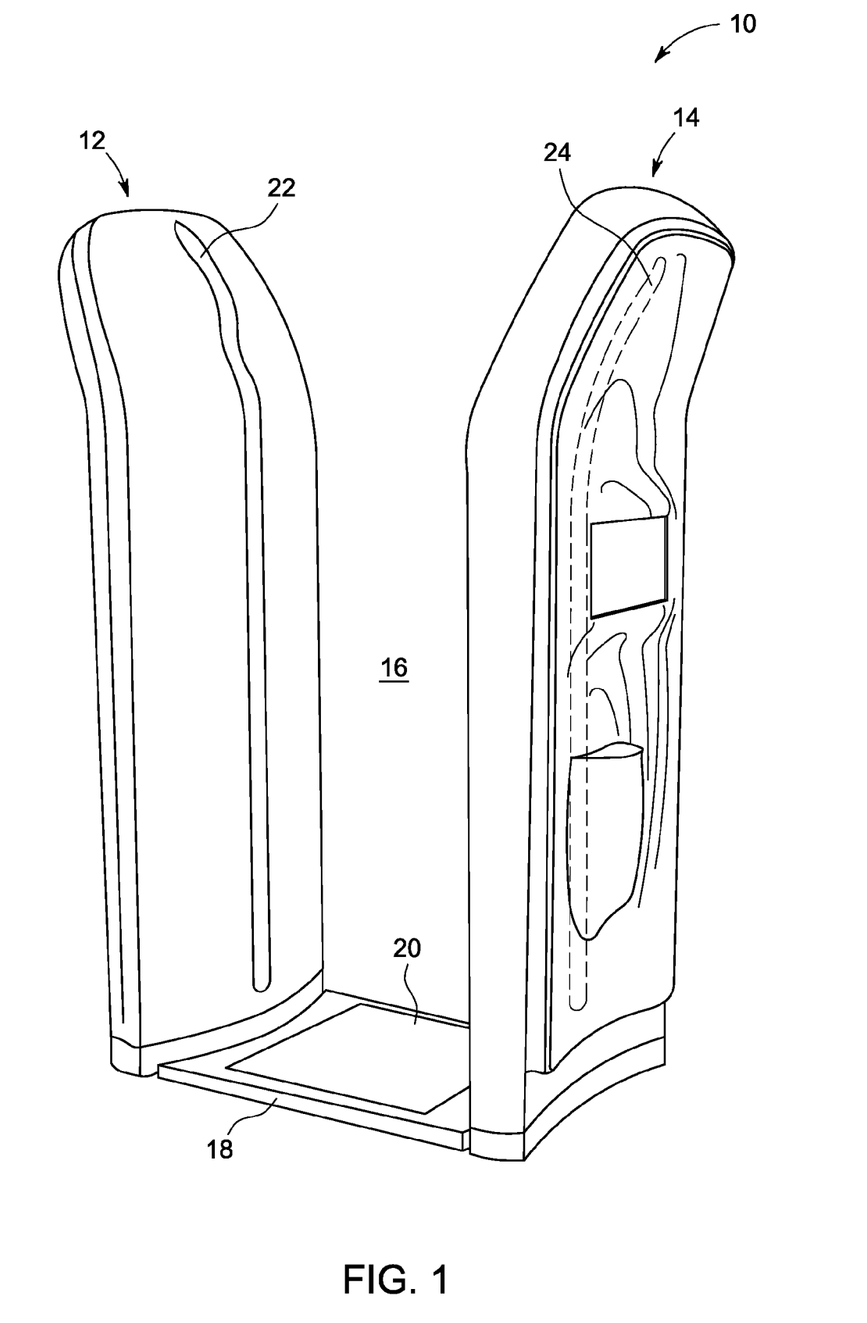
FIG. 1 is a perspective view of walk-through imaging system according to an embodiment of the invention.
Figure 2:
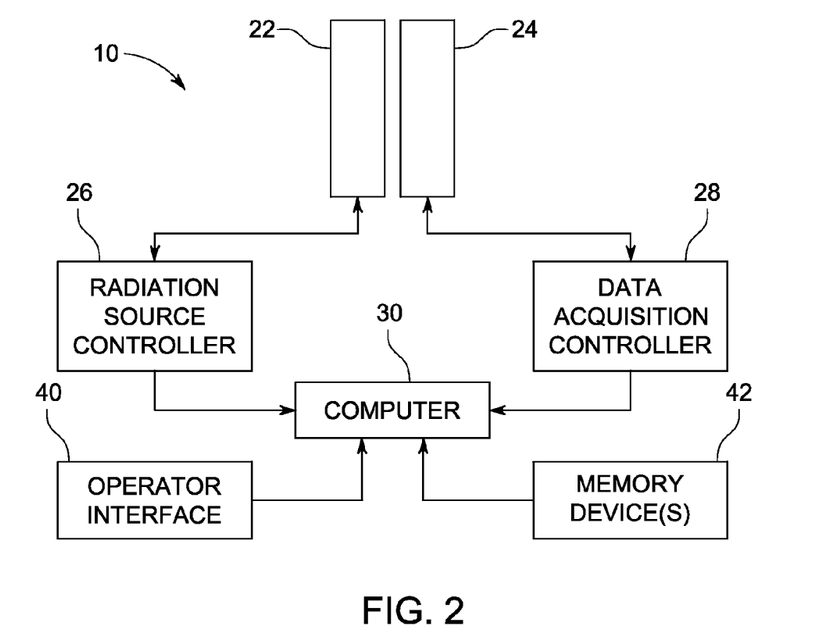
FIG. 2 is a schematic diagram of the walk-through imaging system of FIG. 1 according to an embodiment of the invention.

Referring to FIGS. 1 and 2, a walk-through imaging system 10 is shown according to one embodiment of the invention. The walk-through imaging system 10 implements a 'gate' design that enables a patient or customer (i.e., a subject) to walk or pass through the system without mechanical assistance, so as to provide for quick and efficient image acquisition of the subject. The walk-through imaging system 10 includes a first support structure 12 and a second support structure 14 each oriented in an upright or vertical manner. The first and second support structures 12, 14 are spaced apart so as to define an imaging volume or scanning area 16 of the imaging system 10. The first and second support structures 12, 14 are thus spaced apart a distance sufficient to accommodate, within the imaging area 16, subjects of a variety of shapes and sizes, encompassing a majority of the population. A base structure 18 extends between the first and second support structures 12, 14 and is connected to the support structures at a footing or bottom edge thereof. The base structure 18 can include a marked-off or highlighted region 20 thereon that indicates a desired location for a subject to stand on for performing of an image acquisition. According to one embodiment, a weight sensor or positioning/proximity sensor (not shown) is included in imaging system 10 to determine when the subject is properly positioned for initiation of image acquisition.

Incorporated into first and second support structures 12, 14 are an x-ray source 22 and a detector assembly/arrangement 24, respectively. As shown in FIG. 1, the x-ray source 22 and detector assembly 24 are configured as a linear x-ray source and linear detector assembly that are oriented in a vertical direction, with the linear x-ray source and the detector assembly aligned with one another on opposite sides of the walk-through imaging system 10. According to embodiments of the invention, the x-ray source 22 may be formed as a distributed source that includes a plurality of X-ray sources, such as field emitter devices, or other controllable and addressable X-ray sources, that are linearly aligned in the vertical direction.

Alternatively, the x-ray source 22 may be formed as a moveable x-ray source designed to slide in the vertical direction within first support structure. The detector assembly 24 may be generally similar to conventional digital x-ray detectors, including a scintillator for converting x-ray radiation to lower energy photons, photodiodes for receiving the photons from the scintillator, and transistors for reading out the charge depletion in the photodiodes resulting from the impacting photons. Alternatively, according to an embodiment of the invention, the detector assembly 24 may be formed from a direct conversion material and configured as a photon counting device so as to enable energy discrimination and/or imaging with multiple energy bands. Furthermore, it is recognized that detector assembly 24 may be in the form of either a stationary detector assembly or a translatable detector assembly, so as to enable acquisition of a large area scan.

According to embodiments of the invention, the x-ray source 22 and detector assembly 24 are configured so as to provide for x-ray image data acquisition that enables production of a tomographic image. That is, the linear x-ray source 22 is controlled to emit x-rays towards the subject from a plurality of positions relative to the linear detector arrangement, such that multiple projection views are acquired at differing angles based on the emission of x-rays from the linear x-ray source at the plurality of positions. Based on the multiple projection views, a tomographic image is generated of at least a portion of the subject.

As shown in FIG. 2, to control operation of linear x-ray source 22 and detector arrangement 24, the imaging system 10 includes a radiation source controller 26 and a data acquisition system (DAS) 28, which may both be in operative communication with a computer 30 and controlled thereby. The computer 30 may thus cause radiation source controller 26 to trigger emission of x-ray radiation and also receive data acquired by DAS 28 and coordinate storage and processing of that data. An operator interface 40 may be integral with the computer 30 and will generally include an operator workstation for initiating imaging sequences, controlling such sequences, and manipulating data acquired during imaging sequences, which can be stored in a memory device 42. Additionally, according to one embodiment, computer 30 may perform high speed reconstruction of the x-ray data from DAS 28 to generate an image of the subject or a particular region-of-interest (ROI) of the subject.

In operation, the subject positions himself or herself in the imaging volume 16 of imaging system 10, standing on the marked-off or highlighted region 20 of base structure 18. Upon a determination that the subject is properly positioned in the imaging volume, the linear x-ray source 22 projects/emits a beam of x-rays that is directed to a ROI within the subject. As noted above, control of the x-ray source 22, such as initiation of exposures and/or movement of the x-ray source, may be determined based on a specific region-of-interest to be imaged within the subject and in order to minimize dosage of the x-rays to which the subject is subjected. The radiation traverses the subject and impacts the detector assembly 24, where data can be collected corresponding to a digital x-ray projection from the source location. A number of x-ray images of the subject are acquired in quick succession along a plurality of differing angles/scan planes. The x-ray image data acquired from the subject is sufficient to enable production of a tomographic image, with image reconstruction following a protocol similar to those used for conventional diagnostic imaging. That is, as will be appreciated by those skilled in the art, shift and add, back projection, filtered back projection, iterative reconstruction, or other known reconstruction techniques may be employed.

In operation of imaging system 10, the image acquisition process takes a matter of seconds (e.g., 2 seconds), with the acquired image data providing for diagnosing or providing health information to/about the subject. The short duration of the image acquisition by walk-through imaging system 10 enables the subject to move through the system in an efficient and convenient manner, so as to provide high-throughput, efficient imaging of a large number of subjects in a very cost effective manner. Additionally, the short duration of the image acquisition allows for imaging system 10 to function as a low-dose x-ray imaging system. That is, integration of the linear x-ray source 22 and detector arrangement 24 in imaging system 10 minimizes exposure of the subject to x-ray radiation.

Figure 3:
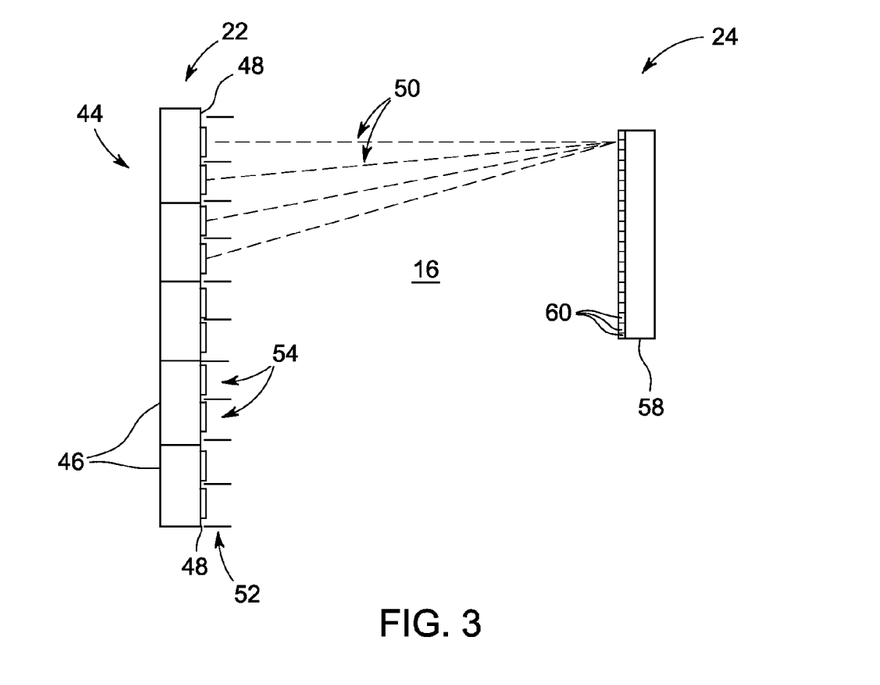
FIG. 3 is illustrative of a linear x-ray source and detector for use with the system of FIGS. 1 and 2 according to an embodiment of the invention.

Referring now to FIG. 3, an x-ray source 22 and detector arrangement 24 of the type that may be employed in the walk-through imaging system 10 is shown, according to an embodiment of the invention. The x-ray source 22 is in the form of a distributed x-ray source 44 that may include one or more cathode modules 46, with each cathode module 46 comprising one or more electron beam emitters 48 that are positioned at focal spot locations and coupled to radiation source controller 26 (shown in FIG. 2) by way of activation connections (not shown). Emitters 48 are separated from one another by a distance that is sufficient in order to allow for production of a good tomographic image and are selectively triggered by the source controller 26 during operation of the imaging system 10. Emitters 48 are positioned facing an anode (not shown) and, upon triggering by the source controller 26, the emitters 48 emit electron beams toward the anode. Upon striking of the electron beams on the anode, which may, for example, be a tungsten rail or element, a primary beam of x-ray radiation 50 is emitted, as indicated at reference numeral 50. According to one embodiment, the primary x-ray beams 50 are directed, then, toward a primary collimator 52, which is generally opaque to the x-ray radiation, but which includes apertures 54. The apertures 54 may be fixed in dimension, or may be adjustable, to permit primary x-ray beams 50 to penetrate through the primary collimator 52 to form focused, collimated primary x-ray beams and to provide a certain beam shape exposing the detector. Alternatively, it is recognized that distributed x-ray source 44 may be employed without the use of a collimator. The primary x-ray beams 50 are directed to imaging volume 16 (i.e., scanning area) of the imaging system 10, are attenuated by the subject, and impact detector arrangement 24 on an opposite side of the imaging system 10.

As shown in FIG. 3, distributed x-ray source 44 and detector arrangement 24 are arranged in a parallel arrangement. That is, emitters 48 of x-ray source 44 are distributed in a linear pattern at a point on the Z axis, so as to extend along the imaging plane, in the "in-plane direction." Detector arrangement 24 includes one or more detectors 58 having a generally linear configuration that is similar to the arrangement of the emitters 46. More specifically, the one or more detectors 58 are oriented perpendicular to the z-axis, parallel to the generally vertical orientation of the subject. Each of the detectors 58 is comprised of a plurality of detector elements 60, which receive the radiation emitted by the linear distributed x-ray source 44 and attenuated by the subject. In one embodiment, detectors 58 are configured as energy sensitive detectors capable of providing data or feedback as to the number and/or energy of photons detected (i.e., photon counting). During image reconstruction, data as to the number and/or energy of photons detected by detector assembly can be used to distinguish materials which appear identical in images reconstructed from conventional systems that do not provide this additional information. According to one embodiment, detectors 58 are comprised of high-purity germanium, cadmium zinc telluride (CZT), or another suitable "direct conversion" material that converts x-rays directly into electrical signals. The detector assembly thus functions as an energy discriminating, direct conversion detector capable of not only x-ray counting, but of also providing a measurement of the energy level of each x-ray detected and providing imaging with multiple energy bands. Signal processing circuitry, such as an application specific integrated circuit (not shown), is associated with each detector 58 to perform a readout therefrom.

The distributed x-ray source 44 provides the ability to generate an x-ray beam from multiple positions relative to the detector arrangement 24, with no need for mechanical movement. According to one embodiment of the invention, the cathode modules 46 and corresponding emitters 48 within linear distributed x-ray source 44 are independently and individually addressable so that radiation can be triggered from each of the focal spot locations at points in time as needed. The triggering of a particular cathode module 46 and its emitters 48 may be determined by the number of differing angles at which it is desired to acquire projection views and by the location of one or more ROIs identified in the subject, for example. In selecting activation of a desired emitter 48 at a focal spot location in distributed x-ray source 44, the angle of the location relative to the detector is considered (along with the location of the ROI) and a desired emitter 48 is then selected/activated based thereon. While described above as being individually or sequentially activated, in other configurations, the emitters 48 are addressable in logical groups. For example, pairs or triplets of emitters 48 may be logically "wired" together. Where desired, and as determined by the identified ROI, more than one such group of emitters 48 may be triggered concurrently at any instant in time, as this would enable rapid acquisitions of large areas of the patient.

Accordingly the cathode modules 46 and corresponding emitters 48 within linear distributed x-ray source 44 are controlled so as to provide for x-ray image data acquisition that enables production of a tomographic image. That is, the distributed x-ray source 44 is controlled to emit x-rays towards the subject from a plurality of positions/angles relative to the linear detector arrangement, such that multiple projection views are acquired at differing angles to provide for generation of a tomographic image.

Figure 4:
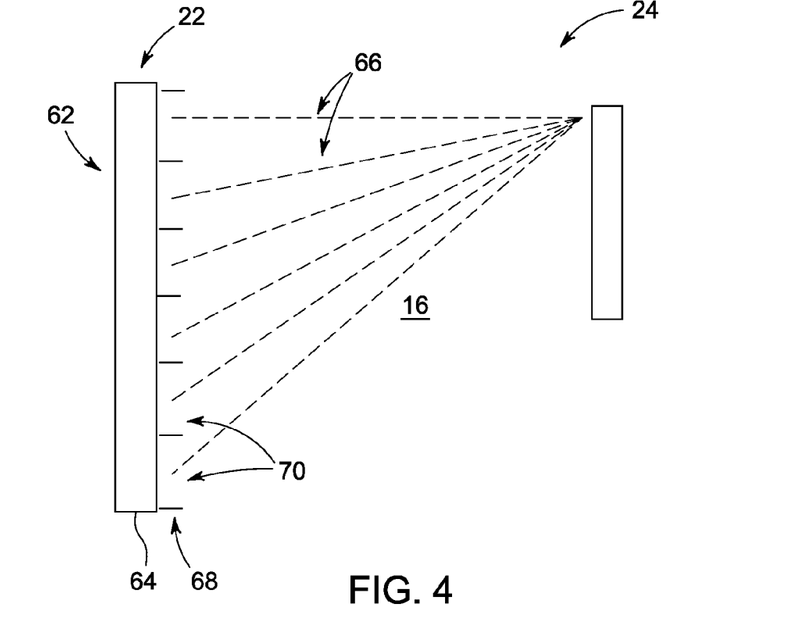
FIG. 4 is illustrative of a linear x-ray source and detector for use with the system of FIGS. 1 and 2 according to another embodiment of the invention.

Referring now to FIG. 4, an x-ray source 22 and detector arrangement 24 of the type that may be employed in the walk-through imaging system 10 is shown, according to another embodiment of the invention. The x-ray source 22 is in the form of a single, stationary x-ray source 62 that includes a single, elongated linear cathode 64, such as being in the shape of a long rod or tube, for example. The x-ray source 62 is coupled to radiation source controller 26 (shown in FIG. 2) by way of an activation connection (not shown). The cathode 64 is positioned facing an anode (not shown) and, upon triggering by the source controller 26, emits a linear shaped electron beam toward the anode. Upon striking of the electron beam on the anode, which may, for example, be a tungsten rail or element, a primary beam of x-ray radiation is emitted, as indicated at reference numeral 66. The primary x-ray beam 66 is directed toward a primary collimator 68, which is generally opaque to the x-ray radiation, but which includes apertures 70. The collimator 68 is constructed as an adjustable collimator such that it is able to form focused, collimated primary x-ray beams 66 that expose the detector 24 from a number of differing angles/locations. That is, the x-rays are collimated so as to be projected towards the subject from a plurality of positions/angles relative to the linear detector arrangement 24, such that multiple projection views are acquired at differing angles to provide for generation of a tomographic image.

Figure 5:
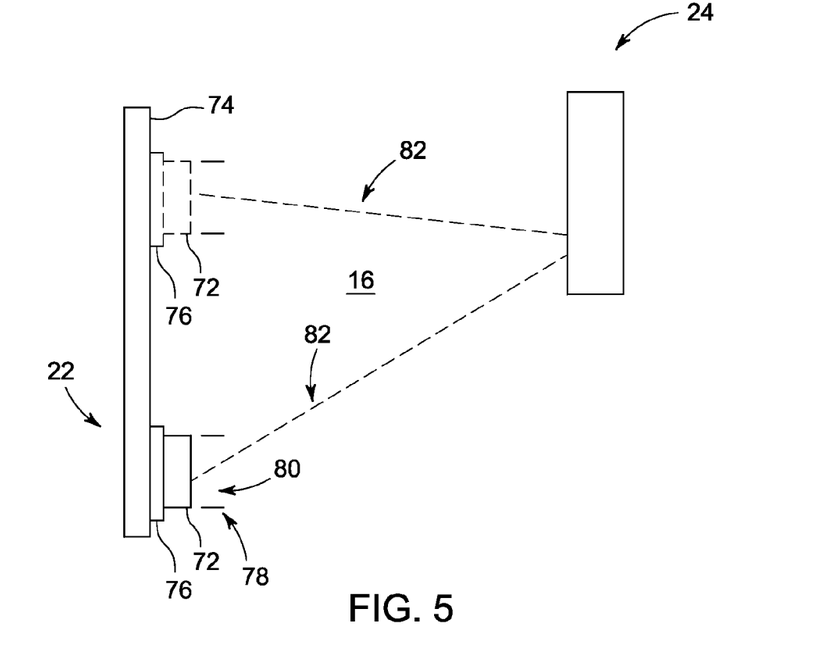
FIG. 5 is illustrative of a linear x-ray source and detector for use with the system of FIGS. 1 and 2 according to another embodiment of the invention.

Referring now to FIG. 5, an x-ray source 22 and detector arrangement 24 of the type that may be employed in the walk-through imaging system 10 is shown, according to still another embodiment of the invention. The x-ray source 22 is in the form of a moveable X-ray source 72 designed to slide or be drawn along a track 74 formed in first support structure 12. One or more motors 76 or other positioning devices may be provided that allow for directing of the x-ray beam appropriately to the detector assembly 24. Similarly, one or more motors or other positioning devices may be provided that are controlled to draw the movable x-ray source 72 along the track 74 between projection view locations (e.g., imaging positions), such that x-ray source 72 moves along a linear path. The source 72 may be moved in a continuous manner or in a "step-and-shoot" mode, according to embodiments of the invention.

A primary collimator 78 is provided that translates with the movable x-ray source and that is generally opaque to the x-ray radiation but which includes apertures 80. The apertures 80 may be fixed in dimension, or may be adjustable, to permit primary x-ray beams 82 to penetrate through the primary collimator 78 to form focused, collimated primary x-ray beams that are directed to imaging volume 16. The radiation source controller 26 (FIG. 2) provides control signals for operation of the x-ray source for its movement and for triggering image acquisition by emission of x-rays from the source and may work in conjunction with data acquisition controller 28 (FIG. 2) to coordinate the movement and energization of the source 72 with image acquisition by the detector 24, such that x-ray image data acquisition that enables production of a tomographic image is achieved. That is, the movable x-ray source 72 is controlled to emit x-rays towards the subject from a plurality of positions/angles relative to the linear detector arrangement 24, as indicated in phantom in FIG. 5, such that multiple projection views are acquired at differing angles to provide for generation of a tomographic image.

Beneficially, embodiments of imaging system 10 provides for a walk-through type imaging system that acquires image data so as to enable the diagnosing or providing of health information to/about a subject. The imaging system provides low-dose x-ray imaging that is enabled by the integration of a linear x-ray source 22 and a linear detector arrangement 24. The short duration of the image acquisition by walk-through imaging system 10 enables the subject to move through the system in an efficient and convenient manner, so as to provide high-throughput, efficient imaging of a large number of subject in a very cost effective manner. Energy discrimination of the received x-rays or imaging with multiple energy bands may also be enabled for embodiments where the linear detector arrangement is configured as a direct conversion, energy discriminating detector.

Therefore, according to one embodiment of the invention, an x-ray imaging system includes a first support structure oriented in a vertical fashion and a second support structure oriented in a vertical fashion and spaced apart from the first support structure to define a scanning area configured to receive a subject to be scanned. The x-ray imaging system also includes a linear x-ray source affixed to the first support structure on one side of the scanning area and oriented in a vertical fashion, with the linear x-ray source configured to emit x-rays towards the subject. The x-ray imaging system further includes a linear detector arrangement affixed to the second support structure on another side of the scanning area and generally opposite the linear x-ray source. The linear detector arrangement configured to receive x-rays after passing through the subject.

According to another embodiment of the invention, a walk-through imaging system includes a gate structure including a first vertical member and a second vertical member spaced apart from the first vertical to define a scanning area, a linear x-ray source configured to emit x-rays towards the subject and being affixed to the first vertical member and positioned vertically thereon, and a linear detector arrangement affixed to the second vertical member and positioned vertically thereon, with the linear detector arrangement configured to receive x-rays attenuated through the subject. The walk-through imaging system also includes a data acquisition system (DAS) connected to the detector arrangement and configured to receive an output of the detector arrangement, which is utilized to generate an image of at least a portion of the subject. The linear x-ray source and linear detector arrangement are configured to acquire x-ray image data from a subject situated within the scanning area in a standing position.

According to yet another embodiment of the invention, a method of acquiring x-ray images of a subject by way of a walk-through imaging system includes the steps of positioning a subject within a scanning area of a gate structure that includes a first vertical member and a second vertical member spaced apart from the first vertical and generating primary x-rays from a vertically oriented linear x-ray source affixed to the first vertical member on one side of the scanning area to scan the subject. The method also includes the steps of receiving x-rays attenuated through the subject from the primary x-rays with a detector arrangement affixed to the second vertical member and on another side of the scanning area generally opposite the linear x-ray source and generating x-ray image data based on the x-rays received by the detector arrangement, the x-ray image data comprising a number of projection views at differing angles. The method further includes the step of performing at least one of storage of the x-ray image data and reconstruction of the x-ray image data to generate a tomographic image of the subject.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An x-ray imaging system comprising:
a first support structure oriented in a vertical fashion;
a second support structure oriented in a vertical fashion and spaced apart from the first support structure to define a scanning area configured to receive a subject to be scanned;
a linear x-ray source affixed to the first support structure on one side of the scanning area and oriented in a vertical fashion, the linear x-ray source comprising a distributed x-ray source having an array of x-ray sources in a linear arrangement, with each x-ray source in the array of x-ray sources being individually controllable to emit x-rays towards the subject;

a linear detector arrangement positioned vertically on and affixed to the second support structure on another side of the scanning area and generally opposite the linear x-ray source and configured to receive x-rays after passing through the subject; and a computer to control operation of the linear x-ray source, the computer programmed to control a radiation source controller configured to individually activate x-ray sources in the array of x-ray sources of the distributed x-ray source so as to emit x-rays towards the subject from a plurality of positions and angles relative to the linear detector arrangement, such that multiple projection views are acquired at differing angles to provide for generation of a tomographic image.

2. The x-ray imaging system of claim 1 wherein the computer is programmed to:

determine a desired number of differing angles at which to acquire projection views relative to a location of one or more regions-of-interest (ROIs) identified in the subject; and cause the radiation source controller to trigger particular x-ray sources in the array of x-ray sources of the distributed x-ray source to emit x-rays based on angles of the x-ray sources relative to the linear detector arrangement and the location of the one or more ROIs.

3. The x-ray imaging system of claim 2 wherein the computer is further programmed to:

acquire multiple projection views based on the emission of x-rays from the linear x-ray source at the plurality of positions; and generate a tomographic image of at least a portion of the subject from the multiple projection views.

4. The x-ray imaging system of claim 1 further comprising a base structure extending between the first and second support structures and being connected to the first and second support structures at bottom edge thereof, wherein the base structure includes a designated region thereon that indicates one or more desired locations for the subject to stand on for performing of an image acquisition.

5. The x-ray imaging system of claim 1 wherein the first support structure, second support structure, and base structure form a gate configuration, the gate configuration imaging system functioning as a walk-through imaging system.

6. The x-ray imaging system of claim 1 wherein the linear detector arrangement comprises an energy sensitive detector configured to provide data on the number and energy of x-rays received thereby.

7. A walk-through imaging system comprising:

a gate structure including a first vertical member and a second vertical member spaced apart from the first vertical member to define a scanning area;

a linear x-ray source affixed to the first vertical member and positioned vertically thereon, the linear x-ray source configured to emit x-rays towards a subject situated within the scanning area in a standing position;

a linear detector arrangement affixed to the second vertical member and positioned vertically thereon, the linear detector arrangement configured to receive x-rays attenuated through the subject;

a collimator arrangement positioned between the subject and the linear x-ray source, wherein the collimator arrangement comprises an adjustable collimator configured to be selectively controlled to collimate the x-rays from the linear x-ray source so as to project x-rays towards the subject from a plurality of positions and angles relative to the linear detector arrangement; and a data acquisition system (DAS) connected to the detector arrangement and configured to receive an output of the detector arrangement, which is utilized to generate a tomographic image of at least a portion of the subject;

wherein the projecting of the x-rays towards the subject from the plurality of positions and angles relative to the linear detector arrangement enables acquisition of multiple projection views at differing angles to provide for generation of the tomographic image.

8. The walk-through imaging system of claim 7 wherein the linear x-ray source comprises a distributed x-ray source including an array of x-ray sources in a linear arrangement, with each x-ray source in the array of x-ray sources being selectively controllable to emit x-rays towards the subject.

9. The walk-through imaging system of claim 7 wherein the linear x-ray source comprises a single, stationary x-ray source having a linear vertical configuration.

10. The walk-through imaging system of claim 7 wherein the linear x-ray source comprises a movable x-ray source configured to be translatable in a vertical direction so as to direct x-rays towards the subject from a plurality of different source positions.

11. The walk-through imaging system of claim 10 wherein the first vertical member comprises a vertically oriented track on which the movable x-ray source is mounted, with the track configured to provide for translating of the movable x-ray source therealong to the plurality of different source positions.

12. The walk-through imaging system of claim 7 wherein the linear detector arrangement comprises an energy sensitive detector formed of a direct conversion material that converts x-rays directly into electrical signals, the energy sensitive detector configured to provide data on at least one of the number and energy of x-rays received thereby.

13. The walk-through imaging system of claim 7 further comprising a computer programmed to:

selectively control operation of at least one of the linear x-ray source and the collimator arrangement such that x-rays are emitted towards the subject from a plurality of positions relative to the linear detector arrangement;

acquire multiple projection views based on the emission of x-rays from the linear x-ray source at the plurality of positions; and generate a tomographic image of at least a portion of the subject from the multiple projection views.

14. A method of acquiring x-ray images of a subject by way of a walk-through imaging system, the method comprising:

positioning a subject within a scanning area of a gate structure of the walk-through imaging system, the gate structure including a first vertical member and a second vertical member spaced apart from the first vertical to define the scanning area;

generating primary x-rays from a vertically oriented linear x-ray source affixed to the first vertical member on one side of the scanning area to scan the subject, the vertically oriented linear x-ray source comprising a distributed x-ray source having an array of x-ray sources in a linear arrangement, with each x-ray source in the array of x-ray sources being individually controllable to emit primary x-rays towards the subject;

receiving x-rays attenuated through the subject from the primary x-rays with a detector arrangement positioned vertically on and affixed to the second vertical member, on another side of the scanning area generally opposite the linear x-ray source; and generating x-ray image data based on the x-rays received by the detector arrangement; and performing at least one of storage of the x-ray image data and reconstruction of the x-ray image data to generate a tomographic image of the subject;

wherein generating primary x-rays from a vertically oriented linear x-ray source comprises:

determining a desired number of differing angles at which to acquire projection views relative to a location of one or more regions-of-interest (ROIs) identified in the subject; and selectively triggering particular x-ray sources in the array of x-ray sources of the distributed x-ray source to emit primary x-rays based on angles of the x-ray sources relative to the detector arrangement and the location of the one or more ROIs.

* * * * *